April 18, 1950     J. W. LATCHUM, JR     2,504,429
RECOVERY OF HYDROCARBONS FROM NATURAL GAS
Filed April 18, 1946     2 Sheets-Sheet 1
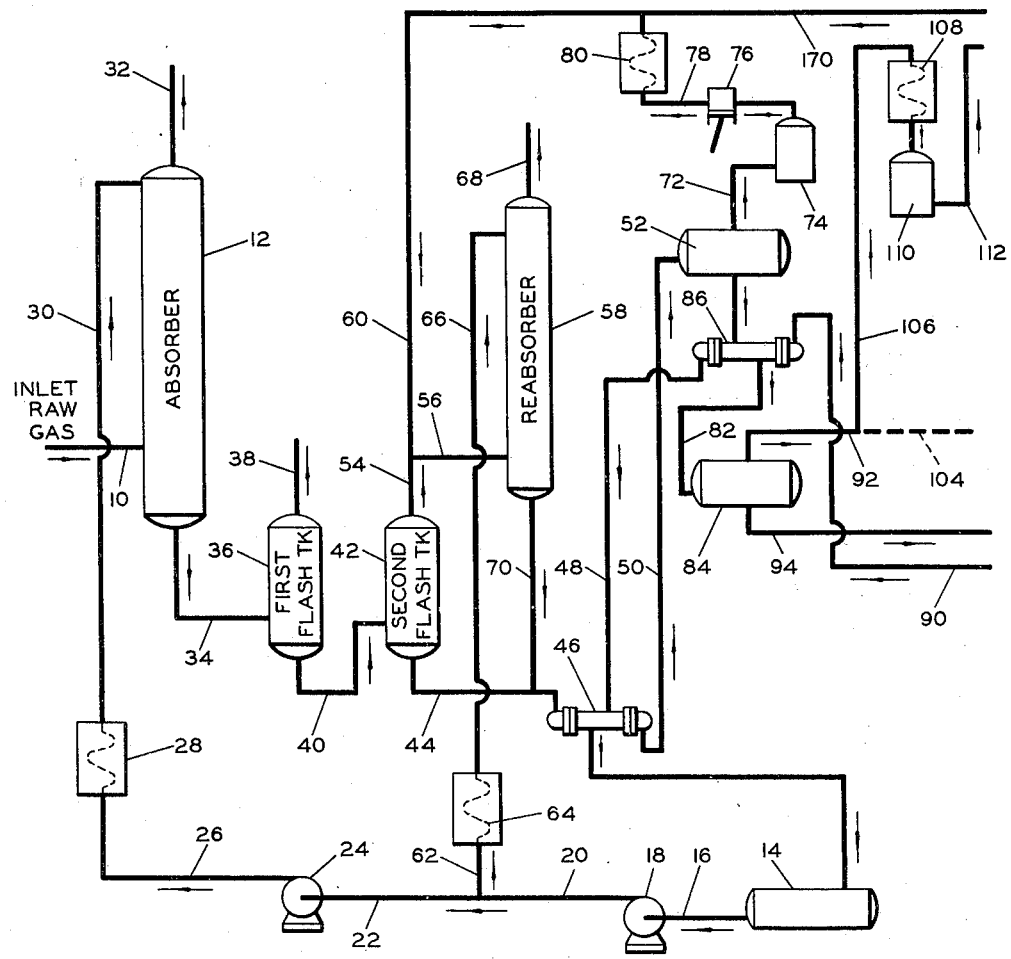
FIG. I-A
*INVENTOR.*
J. W. LATCHUM, JR.
BY
Hudson + Young
ATTORNEYS

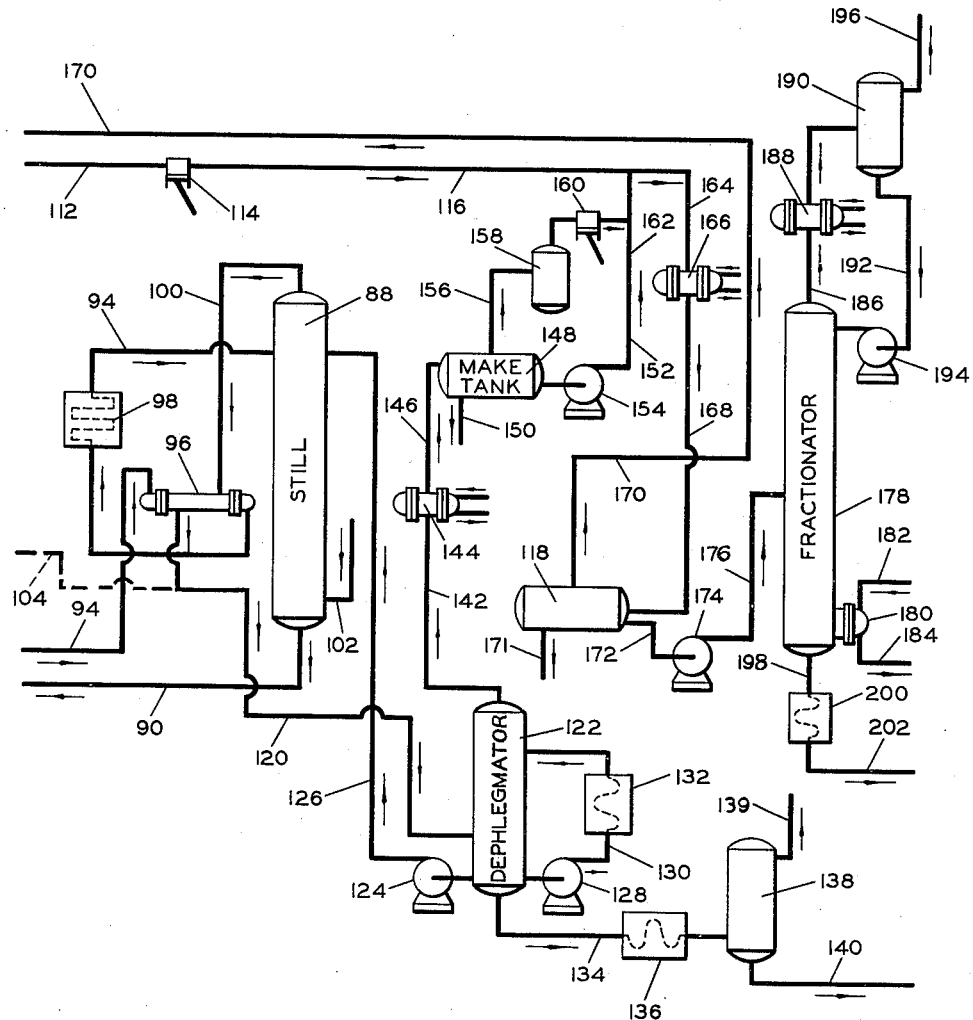
FIG. 1-B
*INVENTOR.*
J. W. LATCHUM, JR.

Patented Apr. 18, 1950

2,504,429

UNITED STATES PATENT OFFICE 2,504,429

RECOVERY OF HYDROCARBONS FROM NATURAL GAS

John W. Latchum, Jr., Bartlesville, Okla., assignor to Phillips Petroleum Company, a corporation of Delaware Application April 18, 1946, Serial No. 663,227

2 Claims. (Cl. 196—8)

This invention relates to recovery of hydrocarbons from gases. It is particularly adapted to the recovery of propane and heavier constituents of natural gas by absorption in absorber oil at relatively high pressures, followed by removal of the absorbed constituents from the rich oil. The invention in certain specific aspects comprises improvements in the desorption steps whereby important savings in equipment and utility costs are realized.

The recovery of natural gasoline from natural gas by absorption in heavy oil is an almost universally used method in the petroleum industry. By "natural gasoline" is meant not only the normally liquid components of natural gas, but also the materials known as liquefied petroleum gases, i. e., propane and the butanes. The raw natural gas is passed in contact with an absorption oil, under conditions such that the absorbing liquid takes up all the liquid gasoline fractions, essentially all the butanes, most of the propane, and smaller amounts of ethane and methane which are unavoidably dissolved. The undissolved gas is rich in methane, and is known as residue gas. This first step of the process is followed by a series of flashing, stripping, and distillation steps, the purpose of which is to discard the dissolved methane and ethane, and to recover from the rich oil the propane and heavier hydrocarbons. The completeness of the propane and butane recovery depends on economic factors affecting a given plant, and may be varied over wide ranges as desired. Similar procedures may be applied to cracked gases, which contain olefins and hydrogen in addition to the paraffins which constitute natural gas. If the cracked gas comprises large amounts of normally liquid hydrocarbons, naphthenes and aromatics are also often present.

The present invention is applicable to processes of the general nature just described. It is especially, though not exclusively, adapted to the recovery of volatile natural gasoline, comprising large proportions of the liquefied petroleum gases, from so-called "dry" gases from high-pressure reservoirs. Such gases, in comparison with "wet" gases, contain relatively small amounts of pentanes and heavier, but are richer in propane and butane. The gas is available at high pressures, and the initial absorption is advantageously effected at a pressure of, say, 1000 pounds per square inch, with resulting extraction of high percentages of methane, ethane, propane, and butane. Most of the subsequent steps for recovery of absorbed hydrocarbons are conducted at progressively decreasing pressures, but certain stages require re-compression of vapors to high pressures.

An important object of this invention is to reduce the power requirements for such recompressions.

Another object is to effect the desired recovery of liquefied hydrocarbons with less equipment than has heretofore been necessary.

A further object is to increase greatly the percentage of vapors condensed in the make tank of a natural gasoline plant.

Yet another object is to reduce the volume of stripping still vapors to be handled and dephlegmated.

A further object is to improve the efficiency of a plant for absorbing hydrocarbons from gases.

Other objects and advantages of the invention will be apparent to one skilled in the art, from the accompanying disclosure and discussion.

The accompanying drawings show somewhat diagrammatically one arrangement of apparatus elements and flow of materials therethrough adapted for the practice of my invention. Figures 1A and 1B when joined together present a single flow sheet of the process. It will be appreciated that various auxiliary items of apparatus, such as valves and control instruments, are not shown in the drawing for the sake of simplicity, as the necessary additional equipment may be readily supplied by one skilled in the art.

In the following description of the drawings, specific operating data at the various points are given for one example. It will be understood that the process conditions may be varied over a considerable range as desired.

The natural gas from which the heavier components are to be recovered is introduced via line 10 into absorber 12, which is operated at 913 pounds per square inch absolute and 100° F. Into the top of absorber 12 is introduced lean absorption oil from lean oil surge tank 14 via line 16, pump 18, line 20, line 22, pump 24, line 26, cooling coil 28 and line 30. Residue gas, rich in methane, is removed from the top of absorber 12 through line 32, while the rich oil is recovered from the bottom through line 34 and passed into a first flash tank 36. The pressure is reduced in this tank to 463 pounds per square inch absolute and the temperature is held at about 100° F. Residue gas is removed through line 38, and the flashed oil is passed via line 40 into a second flash tank 42. Tank 42 is operated at a lowered pressure, which in the example being described is 238 pounds, and the temperature is 100° F.

The rich oil which has thus been twice flashed passes via line 44 through heat exchanger 46 where it is heated by exchange with lean oil in line 48, and thence through line 50 into the primary vent tank 52. Vapors from the second flash tank 42 are passed through lines 54 and 56 into the reabsorber 58. These vapors are joined by the high stage accumulator vapors and primary vent tank vapors flowing from line 60. Lean oil is passed into the top of reabsorber 58 via line 62, cooling coil 64 and line 66. Residue gas is removed from reabsorber 58 through line 68, while enriched oil is removed from the bottom through line 70 and enters line 44 for admixture with the flashed rich oil from the second flash tank 42. The combined rich oil streams then flow to the primary vent tank 52 as described above. Reabsorber 58 is operated at 100° F. and 233 pounds pressure.

Sufficient heat is imparted in heat exchanger 46 to the flashed rich oil flowing through lines 44 and 50 to bring its temperature to 160° F. The pressure is also reduced so that the pressure in the primary vent tank 52 is 163 pounds. Vapors are withdrawn from this tank by line 72 and passed through a conventional scrubber 74 which serves to remove small amounts of oil. The vapors are then passed through compressor 76, lines 78, and cooling coil 80 into line 60 for passage to the reabsorber in company with the high stage accumulator vapors from line 170. Hot liquid from primary vent tank 52 passes via line 82 into a secondary vent tank 84, being additionally heated in heat exchanger 86 which is interposed in line 82. Through the other side of heat exchanger 86 flows hot lean oil which has been removed from the bottom of the still 88 through line 90. The secondary vent tank 84 is operated at 270° F. and 75 pounds per square inch absolute pressure. Vapors are withdrawn therefrom via line 92 while the hot partially denuded oil is withdrawn via line 94.

The oil in line 94, which still contains dissolved therein a small amount of methane and ethane, as well as large amounts of propane, butanes, pentanes, and hexanes and heavier, is passed through the exchanger 96 and preheater 98 before entering the still 88. This still is operated at 58 pounds pressure and 350° F. bottom temperature to drive off the gasoline and lighter vapors, which are removed overhead through line 100. The resulting lean oil is removed from the bottom of still 88 through line 90, and passed as described above through heat exchangers 86 and 46 into the lean oil surge tank 14 for reuse in the absorbers 12 and 58. Into the bottom of still 88 is introduced steam from line 102 to aid in stripping the gasoline hydrocarbons from the absorption oil.

Up to this point in the process the flow and operating conditions are fairly conventional for a natural gasoline absorption plant. However, in the conventional plant vapors withdrawn from the secondary vent tank 84 through line 92 are passed into admixture with the still vapors in line 100, as by means of a conduit 104 which is indicated in the drawing by a dashed line. This is done because the secondary vent tank vapors are hot, should have about the same condensation characteristics as the still overhead, and usually comprise only a small stream. In the practice of my invention, however, line 104 is not used, and instead the secondary vent tank vapors are passed via line 106 through cooling coil 108, scrubber 110, line 112 and compressor 114 into line 116 which leads ultimately to the high stage accumulator 118. While line 116 is shown joining with other lines before going through condenser 166 and reaching high stage accumulator 118, the vapors from compressor 114 may be passed directly to condensation and to the high stage accumulator without admixture with other materials if desired, though this is usually much less advantageous as will appear below. The suction pressure for compressor 114 is 73 pounds in the specific example being described, while the outlet pressure is 243 pounds. By passing the vapors from the secondary vent tank to separate compression and condensation, and by-passing the make tank 148, condensation in tank 148 is greatly enhanced, and total compressor horsepower required to take all the gasoline-containing streams to the high stage accumulator is reduced. The high methane content of the secondary vent tank vapors in this plant is such that addition of these vapors to the still overhead vapors, as by line 104, would substantially reduce the dew point of the latter.

In my invention, the still overhead vapors in line 100, instead of being joined by a secondary vent tank vapor stream from line 92, are passed alone through heat exchanger 96 and line 120 into dephlegmator 122, wherein water and absorption oil are condensed. The bulk of the absorption oil is returned to still 88 from dephlegmator 122 by means of pump 124 and line 126. Part of the water in dephlegmator 122 is removed from the bottom by means of pump 128 and passed through lines 130 and cooling coil 132 into the top of dephlegmator 122 as reflux. The excess water, which represents most of the steam introduced into the bottom of still 88, is passed through line 134 and cooler 136 into oil skimmer 138 and thence through line 140 to any desired use or disposal. Skimmer 138 serves to remove small amounts of heavy absorber oil from the water; the oil is removed through line 139. The dephlegmated still vapors pass through line 142 to condensing and cooling coil 144 where they are partially condensed, and the resulting mixture of liquid and vapor is passed via line 146 into make tank 148. Small amounts of water are removed from tank 148 through line 150. Make tank 148 is operated at 53 pounds and 90° F. The liquid is pumped therefrom through line 152 by means of pump 154 which operates at a discharge pressure of 243 pounds. The vapors from make tank 148, which represent only the lighter ends of the still overhead vapors and are free from the still lighter vapors from the secondary vent tank which would be present in conventional operation, are withdrawn through line 156 and scrubber 158 into compressor 160 which increases the pressure from 53 pounds to 243 pounds. These compressed make tank vapors, as well as the liquid being pumped from the make tank, are combined in line 162 for passage to the high stage accumulator 118. This is accomplished by admixture with the compressed secondary vent vapors in line 116 and passage of the entire high pressure mixture through line 164, partial condenser 166, and line 168 into high stage accumulator 118. The compressed make tank vapors from compressor 160 and/or the make tank liquid discharged from pump 154 could be passed to high stage accumulator 118 separately as desired. However, the combination of these streams with the compressed secondary vent tank vapors from line 116 as shown in the drawing, prior to passage through condenser 166, is much more efficient and is to be preferred.

High stage accumulator 118 is maintained at 238 pounds and 90° F. Vapors are withdrawn therefrom and passed by line 170 and lines 60 and 56 to the reabsorber 58 for recovery of the more valuable components. Accumulator 118 is provided with a water drain 171. The raw gasoline in the high stage accumulator 118, which contains small amounts of undesired methane and ethane dissolved therein, is withdrawn via line 172 and passed by means of pump 174, which discharges through line 176, into fractionator 178. Fractionator 178, which is operated at 250 pounds, is provided with a conventional reboiler 180, heated by steam from line 182, and from which condensate is withdrawn from line 184. Vapors withdrawn from the top of fractionator 178 through line 186 are passed through condenser 188 into reflux accumulator 190. Reflux is returned to the fractionator by means of line 192 and pump 194, while the light gases comprising the fractionator overhead are passed through line 196 to admixture with the other plant residue gas. The raw natural gasoline of the plant is withdrawn as bottoms product of fractionator 178 through line 198 to cooler 200, and is thence passed via line 202 to storage or further fractionation as desired.

In order to further exemplify the invention the following specific data are provided, which show clearly the differences and advantages of the practice of this invention as compared with the conventional practice.

A plant constructed and operated as described above is to process a total of 528,000 mols per day of raw inlet gas of the following composition:

| Component: | Mol per cent |
|---|---|
| Nitrogen | 15.21 |
| Methane | 72.40 |
| Ethane | 6.01 |
| Propane | 3.89 |
| Isobutane | .55 |
| Normal butane | 1.14 |
| Pentanes | 0.50 |
| Hexanes plus | 0.30 |

This is typical of dry gases normally produced from relatively high pressure gas reservoirs.

The vapor from the secondary vent tank consists of 12,643 mols per day, and has this composition:

| Component: | Mol per cent |
|---|---|
| Methane | 12.00 |
| Ethane | 18.65 |
| Propane | 36.60 |
| Isobutane | 8.12 |
| Normal butane | 17.85 |
| Pentanes | 5.07 |
| Hexanes plus | 1.71 |

Overhead hydrocarbon vapors from the still amount to 12,432 mols per day of the following composition:

| Component: | Mol per cent |
|---|---|
| Methane | 1.37 |
| Ethane | 6.28 |
| Propane | 26.00 |
| Isobutane | 10.60 |
| Normal butane | 28.60 |
| Pentanes | 16.00 |
| Hexanes | 11.15 |

If the plant were operated in accordance with previous standard procedures as outlined above, that is, if the secondary vent tank vapors were joined with the still overhead vapors prior to dephlegmation and then partially condensed, the make tank liquid product would be only 3,336 mols per day, and would have the following composition:

| Component: | Mol per cent |
|---|---|
| Methane | .12 |
| Ethane | 1.38 |
| Propane | 11.35 |
| Isobutane | 7.85 |
| Normal butane | 26.30 |
| Pentanes | 26.00 |
| Hexanes | 27.00 |

The recompressor vapors from the make tank in such a case would consist of 21,739 mols per day of the following composition:

| Component: | Mol per cent |
|---|---|
| Methane | 7.74 |
| Ethane | 14.20 |
| Propane | 34.44 |
| Isobutane | 9.57 |
| Normal butane | 22.70 |
| Pentanes | 8.13 |
| Hexanes | 3.22 |

In contrast, by operating in accordance with my invention, the secondary vent tank vapors and the still overhead vapors are not admixed but are treated separately. The former, which are normally available at a pressure of 40 to 80 pounds, are directed to recompressor 114 for compression and subsequent partial condensation in the high-stage product accumulator 118. The still vapors are alone dephlegmated and partially condensed and the following make tank liquid is produced in an amount of 6,026 mols per day.

| Component: | Mol per cent |
|---|---|
| Ethane | 1.15 |
| Propane | 12.85 |
| Isobutane | 9.63 |
| Normal butane | 31.00 |
| Pentanes | 24.90 |
| Hexanes | 20.47 |

The make tank uncondensed vapor stream of 6,406 mols per day, which is passed to the recompressor 160, has this composition:

| Component: | Mol per cent |
|---|---|
| Methane | 2.62 |
| Ethane | 11.15 |
| Propane | 38.50 |
| Isobutane | 11.50 |
| Normal butane | 26.20 |
| Pentanes | 7.63 |
| Hexanes | 2.40 |

Examination of the foregoing data reveals several very marked and advantageous results of the invention, among the most important of which may be mentioned:

1. By the practice of this invention it is necessary to dephlegmate only 12,432 mols per day, whereas in standard practice 25,075 mols per day would have to be handled. This difference makes possible a great reduction in the size of the dephlegmator and in the number of condensers or cooling coils.

2. Approximately 50 per cent of the vapors are condensed in the make tank in my process, whereas only 3,336 mols out of a total of 25,075 mols would be condensed in the standard practice. This point is important because in building gasoline plants it is not economically possible to justify the installation of standby recompressors.

As it is impossible for any mechanical equipment to operate one hundred per cent of the time, this recompressor must be down for repairs and as the plant becomes older may fail completely and be down for two or three days before replacement. When this condition arises the make tank vapors are vented to air or into the fuel system and the gasoline production from the plant is limited to the make tank liquid product, which in the present process is nearly twice as great as in the case of standard design.

3. In conventional practice it is necessary to handle 21,739 mols per day through the recompressor with a suction pressure of 15 to 25 pounds per square inch and a discharge pressure of 225 to 250 p. s. i. In the process disclosed herein, however, only 6,406 mols is so handled; this is 15,333 mols per day less than that handled under standard design. Partly offsetting this, however, it is necessary in my process to compress separately in unit 114 an additional 12,643 mols per day of vapors which have never entered the make tank. It is to be noted that this latter volume of vapors is available to 40 to 80 p. s. i. rather than at 15 to 25 p. s. i. as would be the case if the vapors were all being taken from the make tank. Accordingly, in my process a total of only 19,049 mols per day, part of which is available at a higher pressure, must be compressed as compared with 21,739 mols, all available at one low pressure, in standard design. This effects a net saving of about 158 brake horsepower in recompressor installation in favor of my process as shown in the following tabulation:

| | Horsepower to compress Make Tank vapors to High Stage Accumulator | Horsepower to compress Secondary Vent Tank Vapors to High Stage Accumulator | Total Horsepower Required |
|---|---|---|---|
| Conventional Method | 658 | | 658 |
| Method of This Invention | 211 | 289 | 500 |
| Net Saving | | | 158 |

While certain specific methods of operating have been disclosed herein, it will be appreciated that various modifications can be made without departing from the scope of the invention. To supplement the desired vaporization at any point in the system an added stripping agent, such as steam or low molecular weight gases, may be used. The liberation of dissolved vapors and gases is referred to in the specification and accompanying claims as vaporization of such components or ebullition of the liquid absorbent in which they are dissolved, and this action may be effected by raising temperature, lowering pressure, use of stripping agents, or any combination thereof.

I claim:

1. A process for treating natural gas to recover natural gasoline therefrom which comprises passing the gas under pressure countercurrent to a lean absorption oil to dissolve therein gasoline and part of the lighter components including some methane, rejecting undissolved gas, flashing light gases from the resulting rich oil in a first stage by pressure reduction, subjecting the resulting oil without heating to a second pressure reduction to flash additional light gases therefrom, withdrawing said additional light gases and subjecting same to reabsorption by countercurrent contact with a lean absorption oil, rejecting undissolved gas from said reabsorption step, admixing rich absorption oil from said reabsorption step with the absorption oil from said second pressure reduction, heating the admixture to a temperature higher than employed in said first and second pressure reductions and then subjecting the heated oil to a third pressure reduction to vent additional light gases therefrom, passing said additional light gases to contact with absorption oil in the aforesaid reabsorption step, heating flashed rich oil from said third pressure reduction to a still higher temperature, subjecting thus-heated oil to a fourth pressure reduction and separating therefrom a methane-containing gas which if mixed with the still vapors hereinafter described would reduce the percentage of condensate formed when said vapors are subjected to partial condensation, subjecting partially denuded rich oil resulting from said said fourth pressure reduction and which contains a major proportion of said gasoline to distillation and dephlegmation to produce as bottom product a lean oil and as overhead product still vapors comprising gasoline hydrocarbons, partially condensing the dephlegmated still vapors to produce a vapor fraction and a liquid fraction, pumping said liquid fraction into a high-pressure accumulator, compressing and at least partially condensing said vapor fraction and passing same into said high-pressure accumulator, separately cooling and compressing and then partially condensing the aforesaid methane-containing gas and passing same into said high-pressure accumulator, withdrawing vapors from said high-pressure accumulator, and withdrawing liquid from said high-pressure accumulator and fractionating same to recover natural gasoline therefrom as a product of the process.

2. A process according to claim 1 in which said vapor fraction and said methane-containing gas are first separately compressed, and are then admixed and partially condensed.

JOHN W. LATCHUM, JR.

REFERENCES CITED

The following references are of record in the file of this patent:

UNITED STATES PATENTS

| Number | Name | Date |
|---|---|---|
| 1,507,634 | Thompson | Sept. 9, 1924 |
| 1,813,024 | Clarke et al. | July 7, 1931 |
| 2,327,896 | Houghland | Aug. 24, 1943 |
| 2,328,829 | Maschuitz et al. | Sept. 7, 1943 |
| 2,337,254 | Legatski et al. | Dec. 21, 1943 |

OTHER REFERENCES

Wilson, "Refiner and Natural Gasoline Manufacturer," vol. 21, No. 6, pages 70–75, June, 1942.

"Flow Diagram of Lone Star Gasoline Company's Grapeland Recycling Plant," page 126 of The Petroleum Engineer, Nov. 1940.

Braun, "Refiner and Natural Gasoline Manufacturer," vol. 11, No. 2, pages 192–195, Feb. 1932.

Oberfell et al., "Natural Gasoline," first edition, 1924, pages 241–244.

Certificate of Correction

Patent No. 2,504,429 April 18, 1950

JOHN W. LATCHUM, Jr.

It is hereby certified that error appears in the printed specification of the above numbered patent requiring correction as follows:

Column 7, line 24, for "to", first occurrence, read *at*; column 8, line 70, list of references cited, for "241–244" read *241–244, 260–261*;

and that the said Letters Patent should be read with this correction therein that the same may conform to the record of the case in the Patent Office.

Signed and sealed this 5th day of September, A. D. 1950.

[SEAL]

THOMAS F. MURPHY,
*Assistant Commissioner of Patents.*